(12) United States Patent
Hayashi et al.

(10) Patent No.: US 11,229,887 B2
(45) Date of Patent: Jan. 25, 2022

(54) OZONE WATER SUPPLY METHOD AND OZONE WATER SUPPLY DEVICE

(71) Applicant: ORGANO CORPORATION, Tokyo (JP)

(72) Inventors: Yoshifumi Hayashi, Tokyo (JP); Yukinari Yamashita, Tokyo (JP); Koji Yamanaka, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 153 days.

(21) Appl. No.: 15/118,992

(22) PCT Filed: Jan. 6, 2015

(86) PCT No.: PCT/JP2015/050098
§ 371 (c)(1),
(2) Date: Aug. 15, 2016

(87) PCT Pub. No.: WO2015/125500
PCT Pub. Date: Aug. 27, 2015

(65) Prior Publication Data
US 2016/0361693 A1    Dec. 15, 2016

(30) Foreign Application Priority Data
Feb. 20, 2014    (JP) .............................. JP2014-030742

(51) Int. Cl.
*B01F 3/04*    (2006.01)
*B01F 5/10*    (2006.01)
(Continued)

(52) U.S. Cl.
CPC ...... *B01F 3/04985* (2013.01); *B01F 3/04439* (2013.01); *B01F 3/2057* (2013.01);
(Continued)

(58) Field of Classification Search
CPC .. B01F 3/04985; B01F 3/04439; B01F 5/106; B01F 15/0022; B01F 2003/04886
(Continued)

(56) References Cited

U.S. PATENT DOCUMENTS

| 2006/0049738 | A1* | 3/2006 | Tabata | ..................... C01B 13/11 |
| | | | | 313/362.1 |
| 2009/0026143 | A1* | 1/2009 | Matsumura | .......... A01K 63/042 |
| | | | | 210/695 |
| 2011/0030730 | A1* | 2/2011 | Lynn | ....................... A61L 2/183 |
| | | | | 134/18 |

FOREIGN PATENT DOCUMENTS

| CN | 1774394 | 5/2006 |
| CN | 1774394 A | 5/2006 |

(Continued)

OTHER PUBLICATIONS

Machine translation of JP2013202451, accessed via https://worldwide.espacenet.com on Oct. 3, 2018.*
(Continued)

*Primary Examiner* — Marc C Howell
(74) *Attorney, Agent, or Firm* — Greenblum & Bernstein, P.L.C.

(57) ABSTRACT

An ozonated water supply method includes: feeding dissolving water contained in a circulation tank to an ozonation device at a given feed rate while feeding ultrapure water to the circulation tank, and returning ozonated water that has not been used at a use point to the circulation tank, dissolving ozone in the dissolving water using the ozonation device to obtain ozonated water, and feeding the ozonated water to the use point; feeding oxygen gas having a nitrogen gas content of 0.01 vol % or less to a discharge-type ozone gas-producer, and feeding the resulting ozone-containing gas to the ozonation device; adjusting the feed rate of the ultrapure water to the circulation tank; and adjusting the
(Continued)

dissolved ozone concentration in the ozonated water. The method can reduce or suppress the accumulation of nitric acid in the recirculation system when a discharge-type ozone gas-producer is used as the ozone gas-producer.

9 Claims, 2 Drawing Sheets

(51) Int. Cl.
  *B01F 15/00*    (2006.01)
  *C01B 13/11*    (2006.01)
  *B01F 15/04*    (2006.01)
  *B01F 3/20*    (2006.01)
  *C02F 1/78*    (2006.01)
  *C02F 103/04*    (2006.01)

(52) U.S. Cl.
  CPC .......... *B01F 5/106* (2013.01); *B01F 15/0022* (2013.01); *B01F 15/00344* (2013.01); *B01F 15/0408* (2013.01); *C01B 13/11* (2013.01); *C02F 1/78* (2013.01); *B01F 2003/04886* (2013.01); *C01B 2201/64* (2013.01); *C01B 2201/90* (2013.01); *C02F 2103/04* (2013.01); *C02F 2201/782* (2013.01); *C02F 2209/23* (2013.01)

(58) Field of Classification Search
  USPC ........................................................ 366/132
  See application file for complete search history.

(56) References Cited

FOREIGN PATENT DOCUMENTS

| | | |
|---|---|---|
| JP | 11-278809 | 10/1999 |
| JP | 2000-014753 | 1/2000 |
| JP | H11-068371 | 9/2000 |
| JP | 2001-149947 | 6/2001 |
| JP | 2001-259391 | 9/2001 |
| JP | 2002510245 | 4/2002 |
| JP | 2004-217512 | 8/2004 |
| JP | 2006-295201 | 10/2006 |
| JP | 4019245 | 12/2007 |
| JP | 2006-241772 | 3/2008 |
| JP | 2008-221144 | 9/2008 |
| JP | 2009-248048 | 10/2009 |
| JP | 4827286 | 11/2011 |
| JP | 4830731 | 12/2011 |
| JP | 4909648 | 4/2012 |
| JP | 2013-202451 | 10/2013 |
| JP | 2013-202451 A | 10/2013 |
| JP | 2013202451 A * | 10/2013 |
| KR | 10-2007-0062833 | 6/2007 |
| WO | 2005/080263 | 9/2005 |

OTHER PUBLICATIONS

International Search Report issued in Japanese Patent Application No. PCT/JP2015/050098, dated Mar. 10, 2015.
Korean Office Action issued in Patent Appl. No. 10-2016-7023444, dated Oct. 30, 2017, along with an english translation thereof.
Japanese Office Action with English Translation in respect to Japanese Application No. 2014-030742, dated Dec. 13, 2017.
Office Action issued in corresponding Chinese Patent Application No. 201580009654.3 dated Sep. 5, 2018, and English translation thereof.
First Office Action in Taiwanese application No. 104104188, dated Mar. 14, 2018.
Second Office Action in Taiwanese application No. 104104188, dated Jun. 15, 2018.
Office Action in Korean application No. 10-2019-7004338 dated Feb. 13, 2019 and English translation.
Office Action in Taiwanese application No. 104104188 dated Apr. 25, 2019 (English Translation).
Office Action issued in corresponding Chinese Patent Application No. 201580009654.3 dated Feb. 23, 2021 and English Translation thereof.
Tian et al., "*Study of Soft Drink Processes*", China Metrology Publishing House, p. 26, Oct. 2005, discussed in Office Action, (translation, p. 3) as part of "common general technical knowledge".
Liu, Handbook of Conservation of Petrochemical Industry Environment, Hydrocarbon Processing Publishing House, p. 310, Jan. 1990, discussed in Office Action, (translation, p. 6) as part of "common general technical knowledge".

* cited by examiner

OZONE WATER SUPPLY METHOD AND OZONE WATER SUPPLY DEVICE

TECHNICAL FIELD

The present invention relates to an ozonated water supply method and an ozonated water supply device. More specifically, the invention relates to an ozonated water supply method and an ozonated water supply device that recycle ozonated water that has been fed to the use point, but has not been used at the use point.

BACKGROUND ART

A semiconductor device (including a liquid crystal display device) production process includes repeatedly performing a cleaning step on a substrate in order to remove an organic substance, particles, and the like that adhere to the surface of the substrate. An organic solvent, an acid solution, and the like are widely used as a cleaning liquid used for the cleaning step. In recent years, ozonated water that rarely causes environmental issues has been used as the cleaning liquid.

Ozonated water used for the semiconductor device production process is required to have a high ozone concentration from the viewpoint of reactivity, and is also required to have a high degree of cleanliness and be free of impurities from the viewpoint of preventing contamination of semiconductor devices.

In order to meet these demands, ozonated water is normally produced by dissolving ozone gas produced by electrolysis of water, or produced through a silent discharge, in ultrapure water produced by treating raw water (e.g., industrial water, municipal water, and well water) using an ultrapure water production device. Note that high-purity water that is commonly referred to as "purified water" or "ultrapure water" (that is not necessarily clearly defined) is referred to herein as "ultrapure water". Note that ultrapure water is used when producing ozone gas through electrolysis. High-purity oxygen gas is used when producing ozone gas through a silent discharge. In this case, oxygen gas including a small amount of nitrogen gas is used in order to produce ozone gas in a stable manner.

Ozone is an unstable substance, and easily undergoes autodecomposition in water. Therefore, a TOC component or carbon dioxide may be added to ultrapure water (in which ozone gas is to be dissolved) in order to reduce or suppress the autodecomposition of ozone in the resulting ozonated water, or ozone gas may be dissolved in ultrapure water after mixing carbon dioxide with the ozone gas (see Patent Literature 1).

When using a cleaning method that utilizes ozonated water (that is widely used as described above), ozonated water is fed to the use point in the same amount as that required during cleaning even when cleaning is not performed, taking account of ozone concentration stability. Therefore, it has been desired to reduce the feed rate of ozonated water when cleaning is not performed in order to reduce the amount of water used.

For example, Patent Literature 2 discloses a method that provides a buffer tank to a pipe that feeds ozonated water to the use point, feeds ozonated water stored in the buffer tank to a plurality of cleaning devices at a given feed rate using a feed pump, and returns excess ozonated water to the buffer tank, Patent Literature 3 and 4 disclose a method that feeds ozonated water (that is produced by dissolving ozone gas in water using an ozone gas-dissolving section) to a single cleaning device, and feeds the ozonated water to a circulation tank when the cleaning device is not used so that the ozonated water is used to produce ozonated water together with ultrapure water that is additionally supplied, and Patent Literature 5 discloses a method that provides a tank that receives raw water and water returned from the use point, dissolves ozone gas in water contained in the tank while returning water that has not been used at the use point to the tank, and feeds the resulting ozonated water to the use point.

CITATION LIST

Patent Literature

Patent Literature 1: Japanese Patent No. 4827286
Patent Literature 2: Japanese Patent No. 4830731
Patent Literature 3: Japanese Patent No. 4909648
Patent Literature 4: Japanese Patent No. 4019245
Patent Literature 5: JP-A-2013-202451

SUMMARY OF INVENTION

Technical Problem

The inventors conducted extensive studies in view of the above situation, and found that the following problem may occur. Specifically, when ozonated water is fed while returning (recycling) water that has not been used at the use point to the feed tank, a situation in which the nitric acid concentration in ozonated water increases with the passing of time does not occur when a discharge-type ozone gas production device (e.g., silent discharge device) is used as the ozone gas-producing means, and only high-purity oxygen gas is used to produce ozonated water. However, when oxygen gas having a relatively high nitrogen content (e.g., air, or gas (PSA gas) obtained by concentrating oxygen in air using a pressure swing adsorption device) is used to produce ozonated water, the nitric acid concentration in ozonated water increases with the passing of time.

More specifically, the inventors conducted an experiment by feeding oxygen gas having a nitrogen gas content of 1 vol % to a discharge-type ozone gas production device while returning (recycling) water that had not been used at the use point to a circulation tank to which ultrapure water (raw water) was fed (i.e., while circulating ozonated water that had not been used at the use point) to produce ozone gas, dissolving the ozone gas in water, and feeding the resulting ozonated water to the use point. The nitric acid concentration in the ozonated water was 5 ppb or less (i.e., equal to or less than the minimum limit of determination) immediately after the start of the experiment. However, the nitric acid concentration in the ozonated water increased to about 500 to 600 ppb when several hours had elapsed after the start of the experiment. Such a high nitric acid concentration adversely affects the semiconductor production process.

In the examples disclosed in Patent Literature 5, PSA gas is used to produce ozonated water. It is considered that the accumulation of nitric acid in the system did not occur in the examples disclosed in Patent Literature 5 since ozonated water was removed from the system in small quantities (see paragraph 0024 of Patent Literature 5), or the accumulation of nitric acid in the system was disregarded since the object of the invention disclosed in Patent Literature 5 is to increase the ozone concentration in ozonated water by purging the upper part of the circulation tank using ozone gas.

Accordingly, an object of the invention is to provide an ozonated water supply method that feeds (supplies) ozonated water to the use point while recycling ozonated water that has not been used at the use point, and can reduce or suppress the accumulation of nitric acid in the recirculation system when a discharge-type ozone gas-producing means is used as the ozone gas-producing means, and also provide an ozonated water supply device that is used to implement the ozonated water supply method.

Solution to Problem

Several aspects of the invention solve the above technical problem as described below.

According to a first aspect of the invention, an ozonated water supply method includes:

feeding dissolving water contained in a circulation tank to ozonation means at a given feed rate while feeding ultrapure water to the circulation tank, and returning ozonated water that has not been used at a use point to the circulation tank, dissolving ozone in the dissolving water using the ozonation means to obtain ozonated water, and feeding the ozonated water to the use point;

feeding oxygen gas having a nitrogen gas content of 0.01 vol % or less to discharge-type ozone gas-producing means, producing ozone gas using the discharge-type ozone gas-producing means to obtain an ozone-containing gas, and feeding the ozone-containing gas to the ozonation means;

adjusting the height of the liquid level of the dissolving water in the circulation tank to adjust the feed rate of the ultrapure water to be fed to the circulation tank; and adjusting the amount of ozone to be dissolved in the dissolving water to adjust the dissolved ozone concentration in the ozonated water.

According to a second aspect of the invention, an ozonated water supply device includes a circulation tank to which ultrapure water is fed, and to which ozonated water is returned from a use point, discharge-type ozone gas-producing means that produces ozone gas to obtain an ozone-containing gas, an oxygen gas feed pipe that feeds oxygen gas having a nitrogen gas content of 0.01 vol % or less to the ozone gas-producing means, ozonation means that dissolves the ozone gas produced by the discharge-type ozone gas-producing means in dissolving water to obtain ozonated water, a dissolving water feed pipe that connects the circulation tank and the ozonated means, an ozone-containing gas feed pipe that connects the ozone gas-producing means and the ozonation means, an ozonated water feed pipe that connects the ozonation means and the use point, a return pipe that connects the use point and the circulation tank, circulation tank liquid level control means that controls the height of the liquid level in the circulation tank, and dissolved ozone concentration adjustment means that adjusts the dissolved ozone concentration in the ozonated water.

Advantageous Effects of Invention

One aspect of the invention thus provides an ozonated water supply method that feeds ozonated water to the use point while recycling ozonated water that has not been used at the use point, and can reduce or suppress the accumulation of nitric acid in the recirculation system when a discharge-type ozone gas-producing means is used as the ozone gas-producing means.

DESCRIPTION OF EMBODIMENTS

Figure 1:
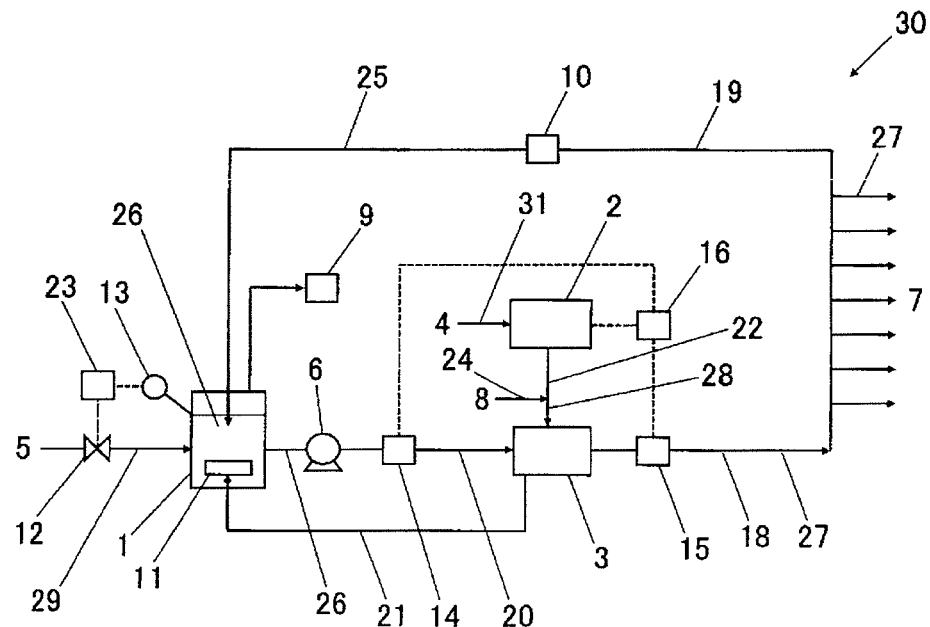
FIG. 1 is a flow diagram illustrating an example of an ozonated water supply device according to one embodiment of the invention.

An ozonated water supply method according to one embodiment of the invention and an ozonated water supply device according to one embodiment of the invention are described below with reference to FIG. 1. FIG. 1 is a flow diagram illustrating a configuration example of the ozonated water supply device according to one embodiment of the invention that is used to implement the ozonated water supply method according to one embodiment of the invention.

As illustrated in FIG. 1, an ozonated water supply device 30 includes a circulation tank 1 to which ultrapure water 5 is fed, and to which ozonated water 25 that has not been used at a use point 7 is returned, a discharge-type ozone gas-producing means 2 that produces ozone gas using oxygen gas 4 to obtain an ozone-containing gas 28, an ozonation means 3 that dissolves the ozone-containing gas 28 obtained by the discharge-type ozone gas-producing means 2 in dissolving water 26, a supply water feed pipe 29 that is connected to the circulation tank 1, and feeds the ultrapure water 5 to the circulation tank 1, a dissolving water feed pipe 20 that connects the circulation tank 1 and the ozonation means 3, and feeds dissolving water 26 contained in the circulation tank 1 to the ozonation means 3, a gas feed pipe 31 that feeds the oxygen gas 4 to the discharge-type ozone gas-producing means 2, an ozone-containing gas feed pipe 22 that connects the discharge-type ozone gas-producing means 2 and the ozonation means 3, and feeds the ozone-containing gas 28 obtained by the discharge-type ozone gas-producing means 2 to the ozonation means 3, an ozonated water feed pipe 18 that connects the ozonation means 3 and the use point 7, and feeds ozonated water 27 produced by the ozonation means 3 to the use point 7, and a return pipe 19 that connects the use point 7 and the circulation tank 1, and returns the ozonated water 25 that has not been used at the use point 7 to the circulation tank 1.

The ozonated water supply device 30 includes a feed means 6 that is provided to the ozone gas feed pipe 22, the feed means 6 being used to feed the dissolving water 26 contained in the circulation tank 1 to the ozonation means 3, feed the ozonated water 27 obtained by the ozonation means 3 to the use point 7, and feed the ozonated water 25 that has not been used at the use point 7 to the circulation tank 1.

The ozonated water supply device 30 includes a water feed rate control section 23. A water feed valve 12 that adjusts the feed rate of the ultrapure water 5 to the circulation tank 1 is provided to the supply water feed pipe 29, and a level gauge 13 that measures the height of the liquid level of the dissolving water 26 contained in the circulation tank 1 is provided to the circulation tank 1. The water feed rate control section 23 is electrically connected to the water feed valve 12, and is also electrically connected to the level gauge 13 (see the dotted lines illustrated in FIG. 1). Note that the water feed rate control section 23, the water feed valve 12, and the level gauge 13 included in the ozonated water supply device 30 correspond to the circulation tank liquid level control means.

A particle removal filter 10 that removes particles from the ozonated water 25 is provided to the return pipe 19 included in the ozonated water supply device 30.

The ozonated water supply device 30 includes a diffusion section 11 that is provided inside the circulation tank 1, and an undissolved ozone gas feed pipe 21 that connects the ozonation means 3 and the diffusion section 11, and feeds undissolved ozone gas that has not been dissolved within the ozonation means 3 to the circulation tank 1.

The ozonated water supply device 30 includes an ozone gas production control section 16. A first concentration meter 14 that measures the dissolved ozone concentration in the dissolving water 26 is provided to the dissolving water feed pipe 20, and a second concentration meter 15 that measures the dissolved ozone concentration in the ozonated water 27 is provided to the ozonated water feed pipe 18. The ozone gas production control section 16 is electrically connected to the first concentration meter 14, and is also electrically connected to the discharge-type ozone gas-producing means 2 (see the dotted lines illustrated in FIG. 1). Note that the ozone gas production control section 16, the first concentration meter 14, and the second concentration meter 15 included in the ozonated water supply device 30 correspond to the dissolved ozone concentration adjustment means.

The ozonated water supply device 30 includes a carbon dioxide feed pipe 24 that is connected to the ozone gas feed pipe 22, and feeds carbon dioxide 8 to the ozone-containing gas feed pipe 22 so as to mix the carbon dioxide 8 into the ozone-containing gas 28.

The ozonated water supply device 30 includes an ozone gas decomposition means 9 that decomposes ozone gas discharged from the circulation tank 1.

An example of the ozonated water supply method according to one embodiment of the invention that is implemented using the ozonated water supply device 30 illustrated in FIG. 1 is described below.

The ultrapure water 5 is fed to the circulation tank 1 before implementing the ozonated water supply method according to one embodiment of the invention to fill the circulation tank 1 with the ultrapure water 5. The ultrapure water 5 contained in the circulation tank 1 is used as the dissolving water 26 in which ozone gas is dissolved.

When implementing the ozonated water supply method according to one embodiment of the invention, the dissolving water 26 contained in the circulation tank 1 is fed to the ozonation means 3. At the same time, the oxygen gas 4 is fed to the discharge-type ozone gas-producing means 2, and the discharge-type ozone gas-producing means 2 produces ozone gas to obtain the ozone-containing gas 28. The ozone-containing gas 28 thus obtained is fed to the ozonation means 3. The ozonation means 3 dissolves the ozone gas in the dissolving water 26 to obtain the ozonated water 27.

The ozonated water 27 is fed to the use point 7. The ozonated water 27 is used at the use point 7 in an amount required for the treatment performed at the use point 7.

The ozonated water 25 that has not been used at the use point 7 is returned to the circulation tank 1. The ultrapure water 5 is fed to the circulation tank 1 in the same amount as the amount of ozonated water used at the use point 7 while the ozonated water 25 is returned to the circulation tank 1. The ozonated water 25 and the ultrapure water 5 that is fed to the circulation tank 1 are mixed in the circulation tank 1, and the resulting mixed water is fed to the ozonation means 3 as the dissolving water 26.

The ozonated water 27 is continuously fed to the use point 7 by continuously performing the operation that feeds the dissolving water 26 contained in the circulation tank 1 to the ozonation means 3 while feeding the ultrapure water 5 to the circulation tank 1, dissolves the ozone gas in the dissolving water 26 to obtain the ozonated water 27, feeds the resulting ozonated water 27 to the use point 7, and returns the ozonated water 25 that has not been used at the use point 7 to the circulation tank 1.

In this case, oxygen gas having a nitrogen gas content of 0.01 vol % or less is fed to the discharge-type ozone gas-producing means 2 as the oxygen gas 4, and the discharge-type ozone gas-producing means 2 produces ozone gas using the oxygen gas 4. The dissolving water 26 is fed from the circulation tank 1 to the ozonation means 3 at a given (constant) feed rate.

The dissolved ozone concentration in the dissolving water 26 (i.e., water in which the ozone gas has not been dissolved using the ozonation means 3) is measured using the first concentration meter 14, and the dissolved ozone concentration in the ozonated water 27 (i.e., water in which the ozone gas has been dissolved using the ozonation means 3) is measured using the second concentration meter 15 while the ozonated water 27 is fed to the use point 7. The dissolved ozone concentration data measured using the first concentration meter 14 is transmitted to a calculation section included in the ozone gas production control section 16. The calculation section included in the ozone gas production control section 16 calculates the amount of ozone gas required to adjust the dissolved ozone concentration in the dissolving water to the desired concentration (i.e., the amount of ozone gas to be fed to the ozonation means 3) from the difference between the dissolved ozone concentration in the dissolving water 26 and the desired dissolved ozone concentration in the ozonated water (that is required at the use point 7). The calculation section included in the ozone gas production control section 16 transmits an instruction regarding the operation conditions for the ozone gas-producing means 2 required to produce ozone gas so as to meet the calculated ozone gas feed rate (e.g., an instruction regarding the feed rate of the oxygen gas 4 to the ozone gas-producing means 2, and an instruction regarding the reaction conditions (e.g., applied voltage)) to the discharge-type ozone gas-producing means 2, so as to adjust the amount of ozone gas produced by the discharge-type ozone gas-producing means 2. The calculation section included in the ozone gas production control section 16 corrects the amount of ozone gas (calculated from the difference between the dissolved ozone concentration measured using the first concentration meter 14 and the desired ozone concentration) based on the difference between the dissolved ozone concentration in the ozonated water 27 and the desired dissolved ozone concentration in the ozonated water that is required at the use point 7, and finely adjust the amount of ozone gas to be fed to the ozonation means 3. The dissolved ozone concentration adjustment means (i.e., the ozone gas production control section 16, the first concentration meter 14, and the second concentration meter 15 included in the ozonated water supply device 30) thus adjusts the dissolved ozone concentration in the ozonated water to the desired concentration that is required at the use point 7.

The height of the liquid level of the dissolving water 26 contained in the circulation tank 1 is measured using the level gauge 13 while the ozonated water 27 is fed to the use point 7. The data that represents the height of the liquid level measured using the level gauge 13 is transmitted to a calculation section included in the water feed rate control section 23. The calculation section included in the water feed rate control section 23 calculates the feed rate of the ultrapure water 5 required to maintain the liquid level of the dissolving water 26 contained in the circulation tank 1 at a given height (i.e., the amount of the ultrapure water 5 to be fed to the circulation tank 1) from the height of the liquid level measured using the level gauge 13. The calculation section included in the water feed rate control section 23 transmits an instruction regarding the opening of the water feed valve 12 to the water feed valve 12 (in order to feed the ultrapure water 5 to the circulation tank 1 at the calculated feed rate) to adjust the feed rate of the ultrapure water 5 to the circulation tank 1. The circulation tank liquid level control means (i.e., the water feed rate control section 23, the level gauge 13, and the water feed valve 12 included in the ozonated water supply device 30) thus adjusts the height of the liquid level of the dissolving water 26 in the circulation tank 1 to adjust the feed rate of the ultrapure water 5 to the circulation tank 1.

The ozonated water supply method according to one embodiment of the invention includes:

feeding dissolving water contained in a circulation tank to an ozonation means at a given feed rate while feeding ultrapure water to the circulation tank, and returning ozonated water that has not been used at a use point to the circulation tank, dissolving ozone in the dissolving water using the ozonation means to obtain ozonated water, and feeding the ozonated water to the use point;

feeding oxygen gas having a nitrogen gas content of 0.01 vol % or less to a discharge-type ozone gas-producing means, producing ozone gas using the discharge-type ozone gas-producing means to obtain an ozone-containing gas, and feeding the ozone-containing gas to the ozonation means;

adjusting the height of the liquid level of the dissolving water in the circulation tank to adjust the feed rate of the ultrapure water to be fed to the circulation tank; and adjusting the amount of ozone to be dissolved in the dissolving water to adjust the dissolved ozone concentration in the ozonated water.

The ozonated water supply method according to one embodiment of the invention includes feeding the dissolving water contained in the circulation tank (to which the ultrapure water is fed, and to which ozonated water that has not been used at the use point is returned) to the ozonation means at a given feed rate while feeding the ultrapure water to the circulation tank, and returning ozonated water that has not been used at the use point to the circulation tank, dissolving ozone gas in the dissolving water using the ozonation means to obtain the ozonated water, feeding the ozonated water to the use point, and returning ozonated water that has not been used at the use point to the circulation tank. Specifically, the ozonated water supply method according to one embodiment of the invention forms an ozonated water recirculation system (i.e., circulation tank→ozonation means→use point→circulation tank), and feeds the ultrapure water to the recirculation system in an amount that corresponds to the amount of ozonated water used at the use point.

High-purity water obtained by treating raw water using a pure water production device or an ultrapure water production device that removes ions and a non-ionic substance from raw water (e.g., industrial water, municipal water, and well water) (i.e., high-purity water that is commonly referred to as "purified water" or "ultrapure water" that is not necessarily clearly defined), is used as the ultrapure water that is fed to the circulation tank. Such high-purity water that is commonly referred to as "purified water" or "ultrapure water" is referred to herein as "ultrapure water". It is preferable that the ultrapure water have a specific resistivity of 1.0 MΩ·cm$^{-1}$ or more, more preferably 10 MΩ·cm$^{-1}$ or more, and still more preferably 18 MΩ·cm$^{-1}$ or more.

The discharge-type ozone gas-producing means is not particularly limited as long as the discharge-type ozone gas-producing means is a discharge-type means that produces ozone using oxygen gas as a raw material. Examples of the discharge-type ozone gas-producing means include a discharge-type ozone gas production device such as a silent discharge device, a corona discharge device, and a creeping discharge device. Among these, a silent discharge device is preferable. The ozonated water supply method according to one embodiment of the invention feeds the oxygen gas to the discharge-type ozone gas-producing means to produce ozone gas to obtain the ozone-containing gas, and feeds the ozone-containing gas to the ozonation means. A silent discharge device produces ozone gas through a silent discharge using oxygen gas or an oxygen-containing gas as a feed gas.

The oxygen gas that is fed to the discharge-type ozone gas-producing means is oxygen gas having a nitrogen gas content of 0.01 vol % or less (preferably 0.001 vol % or less). The oxygen gas that is fed to the discharge-type ozone gas-producing means has a purity (oxygen gas purity) of 99.99 vol % or more (preferably 99.999 vol % or more). If the oxygen gas includes nitrogen gas, nitrogen oxides (e.g., $N_2O_5$ and $N_2O$) are produced in addition to ozone when producing ozone gas from the oxygen gas using a discharge-type ozone gas production device (e.g., silent discharge device). When the nitrogen oxides are dissolved in water, nitric acid is produced. The ozonated water supply method according to one embodiment of the invention can prevent the production of nitrogen oxides, or reduce the production of nitrogen oxides as much as possible, when producing ozone gas using the discharge-type ozone gas-producing means, since the nitrogen gas content in the oxygen gas is set to 0.01 vol % or less (preferably 0.001 vol % or less). Therefore, when the ozone gas is dissolved in the dissolving water, nitric acid is not produced in the ozonated water, or only a trace amount of nitric acid is produced in the ozonated water. This makes it possible to reduce or suppress the accumulation of nitric acid in the recirculation system even when ozonated water that has not been used at the use point is continuously returned (recycled) to the circulation tank. The oxygen gas may includes a small amount of helium, argon, or carbon dioxide so that the discharge-type ozone gas-producing means can produce ozone gas in a stable manner.

When producing ozone gas using the oxygen gas having a nitrogen gas content of 0.01 vol % or less (preferably 0.001 vol % or less) utilizing a silent discharge device as the discharge-type ozone gas-producing means, a nitrogen-free-compliant silent discharge device such as a silent discharge device in which a catalytic substance (e.g., titanium oxide) is used as a dielectric included in a discharge cell, may be used as the silent discharge device. When using a silent discharge device in which a catalytic substance (e.g., titanium oxide) is used as a dielectric included in a discharge cell, it is unnecessary to feed (add) any gas other than oxygen gas. Examples of such a silent discharge device include the silent discharge devise disclosed in Japanese Patent No. 3740254, the silent discharge device disclosed in JP-B-6-21010, and the like.

The operating conditions (e.g., the reaction conditions such as the feed rate of the oxygen gas, the applied voltage, and the oxygen gas pressure, and the device configuration such as the electrode-to-electrode distance) for the discharge-type ozone gas-producing means are appropriately selected taking account of the desired dissolved ozone concentration in the ozonated water, the feed rate of the ozonated water, the type of ozone gas-producing means, and the like.

Ozone may be dissolved in the dissolving water in an arbitrary way using the ozonation means. For example, ozone may be dissolved in the dissolving water using a membrane dissolution method that injects ozone gas into the dissolving water through a gas-permeable membrane to dissolve the ozone gas, a method that bubbles ozone gas into the dissolving water to dissolve the ozone gas, a method that dissolves ozone gas in the dissolving water through an ejector, a method that feeds ozone gas to a position on the upstream side of a pump that feeds the dissolving water to a gas dissolution tank, and dissolves the ozone gas in the pump by applying a stirring force, or the like. The gas-permeable membrane used for the membrane dissolution method is not particularly limited. It is preferable to use a fluororesin-based hydrophobic porous membrane that can endure the strong oxidizing power of ozone.

When implementing the ozonated water supply method according to one embodiment of the invention, the dissolving water is fed from the circulation tank to the ozonation means at a given (constant) feed rate. If the feed rate of the dissolving water to the ozonation means varies when dissolving the ozone gas in the dissolving water using the ozonation means, it may be difficult to adjust the dissolved ozone concentration in the ozonated water, and obtain the ozonated water in a staple manner. This is because the contact time of the ozone gas with the dissolving water in the ozonation means varies, or the attenuation factor of the dissolved ozone concentration varies due to a variation in water feed time, for example. When the dissolving water is fed to the ozonation means at a given feed rate when dissolving the ozone gas in the dissolving water using the ozonation means, it is possible to easily adjust the dissolved ozone concentration in the ozonated water (even when the dissolved ozone concentration in the dissolving water varies) by adjusting the feed rate of the ozone gas to the ozonation means. Therefore, it is possible to obtain the ozonated water in a stable manner. Note that the expression "the dissolving water is fed from the circulation tank to the ozonation means at a given feed rate" and the like used herein do not mean that the feed rate of the dissolving water is not changed. Specifically, the feed rate of the dissolving water may be changed as long as it is possible to easily adjust the dissolved ozone concentration in the ozonated water (even when the dissolved ozone concentration in the dissolving water varies) by adjusting the feed rate of the ozone gas to the ozonation means. The allowable variation width of the feed rate of the dissolving water differs depending on the feed rate of the dissolving water, but is preferably within ±25% with respect to the feed rate of the dissolving water.

The number of use points may be 1, or may be 2 or more. When the number of use points is 1, the ozonated water is rarely used at the use point in a constant amount (i.e., the amount of the ozonated water used normally changes). When the number of use points is 2 or more, the amount of the ozonated water used at each use point may change, and the number of use points that are used at the same time may also change. Therefore, the ozonated water supply method according to one embodiment of the invention maximizes the feed rate of the dissolving water from the circulation tank to the ozonation means taking account of a change in the amount of the ozonated water used at the use point, and returns ozonated water that has not been used at the use point (due to a change in the amount of the ozonated water used at the use point) to the circulation tank. When a branch pipe that feeds the ozonated water from the ozonated water feed pipe to the use point is designed to have a short length or a small diameter, for example, it is possible to minimize the effect of a decrease in dissolved ozone concentration (at an early stage in which the ozonated water is fed to the use point) due to autodecomposition of the ozonated water that remains in the branch pipe (when the ozonated water is not used).

The ozonated water supply method according to one embodiment of the invention returns ozonated water that has not been used at the use point to the circulation tank, and mixes the ozonated water with the ultrapure water that is fed to the circulation tank to prepare the dissolving water. It is preferable that the end of the return pipe be situated in the circulation tank at a position under the liquid surface. This makes it possible to suppress the diffusion of ozone gas into the gas phase that might occur if the ozonated water were dropped onto the liquid surface from the gas phase present in the upper part of the circulation tank.

When implementing the ozonated water supply method according to one embodiment of the invention, the mixing ratio of the ozonated water to the ultrapure water in the circulation tank changes when the amount of the ozonated water returned from the use point changes, and the dissolved ozone concentration in the dissolving water also changes. Therefore, the ozonated water supply method according to one embodiment of the invention adjusts the dissolved ozone concentration in the ozonated water obtained by the ozonation means to the desired dissolved ozone concentration at the use point by adjusting the amount of ozone to be dissolved in the dissolving water using the ozonation means. The amount of ozone to be dissolved in the dissolving water may be adjusted by adjusting the concentration of ozone gas produced using the discharge-type ozone gas-producing means, or adjusting the pressure of the ozone-containing gas that is fed to the ozonation means, or adjusting the feed rate of the ozone-containing gas that is fed to the ozonation means, for example. It is preferable to adjust the amount of ozone to be dissolved in the dissolving water (i.e., adjust the dissolved ozone concentration in the ozonated water) using one means, or two or more means, among a means that adjusts the concentration of ozone gas produced using the discharge-type ozone gas-producing means, a means that adjusts the pressure of the ozone-containing gas that is fed to the ozonation means, and a means that adjusts the feed rate of the ozone-containing gas that is fed to the ozonation means.

The concentration of ozone gas produced using the discharge-type ozone gas-producing means may be adjusted (in order to adjust the amount of ozone to be dissolved in the dissolving water) by adjusting the ozone gas concentration in the ozone-containing gas by adjusting the amount of ozone gas produced using the discharge-type ozone gas-producing means. The pressure of the ozone-containing gas that is fed to the ozonation means may be adjusted (in order to adjust the amount of ozone to be dissolved in the dissolving water) by adjusting the opening of a valve that is provided to a discharge pipe that discharges ozone gas that has not been dissolved in the ozonation means.

The amount of ozone gas produced using the discharge-type ozone gas-producing means may be adjusted by adjusting the ozone concentration in the ozone-containing gas by adjusting the voltage applied to the discharge cell of the discharge-type ozone gas production device (e.g., silent discharge device), or adjusting the feed rate of the oxygen gas to the ozone gas-producing means, for example.

The dissolved ozone concentration in the ozonated water may be adjusted (by adjusting the feed rate of the ozone gas to the ozonation means by adjusting the amount of ozone gas produced using the discharge-type ozone gas-producing means) using an arbitrary method. For example, it is preferable to use the following method. Specifically, the dissolved ozone concentration in the ozonated water (i.e., the dissolved ozone concentration in the ozonated water in which the ozone gas has been dissolved using the ozonation means) is adjusted by measuring the dissolved ozone concentration in the dissolving water (i.e., the dissolved ozone concentration in the ozonated water before being fed to the ozonation means), calculating the feed rate of the ozone gas to be fed to the ozonation means based on the measured dissolved ozone concentration (i.e., calculating the feed rate of the ozone gas required to increase the dissolved ozone concentration in the dissolving water to the desired dissolved ozone concentration at the use point from the difference between the dissolved ozone concentration in the dissolving water and the desired dissolved ozone concentration at the use point), adjusting the amount of ozone gas produced using the ozone gas-producing means so that the feed rate of the ozone gas thus calculated is achieved, and adjusting the feed rate of the ozone gas fed to the ozonation means (hereinafter may be referred to as "ozonated water dissolved ozone concentration adjustment method A"). According to the ozonated water dissolved ozone concentration adjustment method A, it is possible to easily adjust the dissolved ozone concentration in the ozonated water when the dissolved ozone concentration in the dissolving water has changed.

The ozonated water dissolved ozone concentration adjustment method A may further include measuring the dissolved ozone concentration in the ozonated water (i.e., the dissolved ozone concentration in the ozonated water in which the ozone gas has been dissolved using the ozonation means), calculating the difference between the measured dissolved ozone concentration and the desired dissolved ozone concentration at the use point, and finely adjusting the amount of ozone gas produced using the discharge-type ozone gas-producing means based on the calculated difference in concentration.

When implementing the ozonated water supply method according to one embodiment of the invention, when the amount of the ozonated water used at the use point has changed, it is necessary to change the amount of the ultrapure water to be fed to the recirculation system corresponding to the change in the amount of the ozonated water used at the use point. In this case, the ozonated water supply method according to one embodiment of the invention adjusts the feed rate of the ultrapure water that is fed to the circulation tank by adjusting the height of the liquid level of the dissolving water in the circulation tank to change the amount of the ultrapure water to be fed to the recirculation system.

The ozonated water supply method according to one embodiment of the invention may adjust the feed rate of the ultrapure water that is fed to the circulation tank using an arbitrary method. For example, it is preferable to use the following method. Specifically, the feed rate of the ultrapure water that is fed to the circulation tank is adjusted by providing a level gauge to the circulation tank, measuring the height of the liquid level of the dissolving water in the circulation tank, calculating the feed rate of the ultrapure water required to maintain the liquid level of the dissolving water in the circulation tank at a given height based on the height of the liquid level measured as described above, and adjusting the height of the liquid level of the dissolving water in the circulation tank by feeding the ultrapure water to the circulation tank at the calculated feed rate.

The ozonated water supply method according to one embodiment of the invention feeds the dissolving water contained in the circulation tank to the ozonation means, feeds the ozonated water to the use point, and returns ozonated water that has not been used at the use point to the circulation tank using the feed means. The feed means used to feed the dissolving water contained in the circulation tank to the ozonation means, the feed means used to feed the ozonated water to the use point, and the feed means used to return ozonated water that has not been used at the use point to the circulation tank, are not particularly limited. Examples of the feed means include a bellows pump, a magnetically suspended pump, and the like. It is preferable to use a feed means that has ozone resistance, and produces only a small amount of particles. In the example illustrated in FIG. 1, one feed means is provided between the circulation tank and the ozonation means. Note that the position and the number of feed means are not limited thereto. The position and the number of feed means are appropriately selected taking account of the feed rate of the ozonated water to the use point, the feeding method, the configuration of the ozone supply device, and the like.

When implementing the ozonated water supply method according to one embodiment of the invention, carbon dioxide may be mixed with the ozone gas produced using the ozone gas-producing means, and the mixture may be fed to the ozonation means in order to suppress autodecomposition of ozone. Alternatively, carbon dioxide may be dissolved in the dissolving water (that is to be fed to the ozonation means) or the ultrapure water, or may be dissolved in the ozonated water in which ozone gas has been dissolved using the ozonation means.

The ozonated water supply method according to one embodiment of the invention may include removing particles from the ozonated water that is returned from the use point using a particle removal filter. The particle removal filter may be provided to an arbitrary line that is provided between the circulation tank and the use point and feeds the ozonated water. Note that it is possible to reduce or suppress an increase in the amount of particles due to recycling without causing a decrease in the feed pressure of the ozonated water fed to the use point, by removing particles from the ozonated water that is returned from the use point using the particle removal filter.

When implementing the ozonated water supply method according to one embodiment of the invention, ozone gas that has not been dissolved in the dissolving water using the ozonation means may be fed to the circulation tank. It is possible to effectively utilize ozone gas that has not been dissolved in the dissolving water using the ozonation means by feeding ozone gas that has not been dissolved in the dissolving water using the ozonation means to the circulation tank. Ozone gas that has not been dissolved in the dissolving water using the ozonation means may be fed to the circulation tank using an arbitrary method. For example, the ozone gas discharged from the ozonation means may be introduced into a diffusion pipe provided to the circulation tank.

Since the ozonated water supply method according to one embodiment of the invention returns ozonated water that has not been used at the use point to the circulation tank to mix the ozonated water with the ultrapure water, dissolves ozone gas in the resulting dissolving water, and feeds the resulting ozonated water to the use point, part of the ozonated water is circulated through the recirculation system. The ozonated water supply method according to one embodiment of the invention can recycle the entire ozonated water that has not been used at the use point as the dissolving water since nitrogen oxides are not produced in the discharge-type ozone gas production device, or only a trace amount of nitrogen oxides are produced in the discharge-type ozone gas production device. When implementing the ozonated water supply method according to one embodiment of the invention, traces of impurities may accumulate in the recirculation system, and the impurity content in the dissolving water may increase while the ozonated water is repeatedly circulated through the recirculation system. In such a case, part or the entirety of the dissolving water contained in the circulation tank or the ozonated water returned to the circulation tank may be regularly or irregularly discharged from the circulation tank, the ultrapure water may be fed to the circulation tank, and the ozonated water supply method according to one embodiment of the invention may then be performed. Alternatively, the ozonated water supply method according to one embodiment of the invention may be performed while discharging a given amount of dissolving water or ozonated water (returned to the circulation tank) from the circulation tank.

The ozonated water supply device according to one embodiment of the invention includes a circulation tank to which ultrapure water is fed, and to which ozonated water is returned from a use point, a discharge-type ozone gas-producing means that produces ozone gas to obtain an ozone-containing gas, an oxygen gas feed pipe that feeds oxygen gas having a nitrogen gas content of 0.01 vol % or less to the ozone gas-producing means, an ozonation means that dissolves the ozone gas produced by the discharge-type ozone gas-producing means in dissolving water to obtain ozonated water, a dissolving water feed pipe that connects the circulation tank and the ozonation means, an ozone-containing gas feed pipe that connects the ozone gas-producing means and the ozonation means, an ozonated water feed pipe that connects the ozonation means and the use point, a return pipe that connects the use point and the circulation tank, a circulation tank liquid level control means that controls the height of the liquid level in the circulation tank, and a dissolved ozone concentration adjustment means that adjusts the dissolved ozone concentration in the ozonated water.

The discharge-type ozone gas-producing means included in the ozonated water supply device according to one embodiment of the invention is not particularly limited as long as the discharge-type ozone gas-producing means is a discharge-type means that produces ozone using oxygen gas as a raw material. Examples of the discharge-type ozone gas-producing means include a discharge-type ozone gas production device such as a silent discharge device, a corona discharge device, and a creeping discharge device. Among these, a silent discharge device is preferable.

The oxygen gas feed pipe that feeds oxygen gas having a nitrogen gas content of 0.01 vol % or less (preferably 0.001 vol % or less) to the discharge-type ozone gas-producing means is connected to the discharge-type ozone gas-producing means. Examples of the silent discharge device include a silent discharge device in which a catalytic substance (e.g., titanium oxide) is used as a dielectric included in a discharge cell.

The ozonation means included in the ozonated water supply device according to one embodiment of the invention is not particularly limited as long as the ozonation means can dissolve ozone gas in the dissolving water. Examples of the ozonation means include a membrane dissolution device that injects ozone gas into the dissolving water through a gas-permeable membrane to dissolve the ozone gas, a dissolving means that bubbles ozone gas into the dissolving water to dissolve the ozone gas, a dissolving means that dissolves ozone gas in the dissolving water through an ejector, a dissolving means that feeds ozone gas to a position on the upstream side of a pump that feeds the dissolving water to a gas dissolution tank, and dissolves the ozone gas in the pump by applying a stirring force, and the like. The gas-permeable membrane used for the membrane dissolution device is not particularly limited. It is preferable to use a fluororesin-based hydrophobic porous membrane that can endure the strong oxidizing power of ozone.

Examples of the dissolved ozone concentration adjustment means included in the ozonated water supply device according to one embodiment of the invention include a dissolved ozone concentration adjustment means that includes a first concentration meter that measures the dissolved ozone concentration in the dissolving water, and a calculation section that calculates the feed rate of the ozone gas to be fed to the ozonation means based on the dissolved ozone concentration measured by the first concentration meter, and adjusts the amount of ozone gas produced using the discharge-type ozone gas-producing means (hereinafter may be referred to as "dissolved ozone concentration adjustment means A"). According to the dissolved ozone concentration adjustment means A, it is possible to easily adjust the dissolved ozone concentration in the ozonated water when the dissolved ozone concentration in the dissolving water has changed. The dissolved ozone concentration adjustment means A may further include a second concentration meter that measures the dissolved ozone concentration in the ozonated water.

Examples of the circulation tank liquid level control means included in the ozonated water supply device according to one embodiment of the invention include a circulation tank liquid level control means that includes a water feed valve that is provided to a supply water feed pipe, and adjusts the feed rate of the ultrapure water to the circulation tank, a level gauge that is provided to the circulation tank, and measures the height of the liquid level of the dissolving water in the circulation tank, and a water feed rate control section that is electrically connected to the water feed valve and the level gauge, calculates the feed rate of the ultrapure water required to maintain the liquid level of the dissolving water in the circulation tank at a given height based on data that represents the height of the liquid level of the dissolving water in the circulation tank transmitted from the level gauge, and transmits an instruction to the water feed valve so that the opening of the water feed valve is adjusted to achieve the calculated feed rate of the ultrapure water.

The ozonated water supply device according to one embodiment of the invention includes a feed means that feeds the dissolving water contained in the circulation tank to the ozonation means, a feed means that feeds the ozonated water to the use point, and a feed means that returns ozonated water that has not been used at the use point to the circulation tank. The feed means are not particularly limited. Examples of the feed means include a bellows pump, a magnetically suspended pump, and the like. It is preferable to use a feed means that has ozone resistance, and produces only a small amount of particles. In the example illustrated in FIG. 1, one feed means is provided between the circulation tank and the ozonation means. Note that the position and the number of feed means are not limited thereto. The position and the number of feed means are appropriately selected taking account of the feed rate of the ozonated water to the use point, the feeding method, the configuration of the ozone supply device, and the like.

The ozonated water supply device according to one embodiment of the invention may include a carbon dioxide feed pipe that feeds carbon dioxide to the recirculation system (i.e., adds carbon dioxide to the ozonated water) in order to suppress autodecomposition of ozone. The carbon dioxide feed pipe may be provided at an arbitrary position within the ozonated water supply device according to one embodiment of the invention. For example, the carbon dioxide feed pipe may be provided to the ozone-containing gas feed pipe that feeds the ozone-containing gas (obtained by the ozone gas-producing means as a result of producing ozone gas) to the ozonation means, or may be provided to the dissolving water feed pipe that feeds the dissolving water contained in the circulation tank to the ozonation means, or the like.

The ozonated water supply device according to one embodiment of the invention may include a particle removal filter that is provided to the return pipe and removes particles from the ozonated water that is returned from the use point. It is possible to remove particles from the ozonated water without causing a decrease in the feed pressure of the ozonated water fed to the use point, by providing the particle removal filter to the return pipe that returns the ozonated water from the use point.

The ozonated water supply device according to one embodiment of the invention may include an undissolved ozone gas feed means that feeds ozone gas that has not been dissolved in the dissolving water using the ozonation means to the circulation tank. Examples of the undissolved ozone gas feed means include an undissolved ozone gas feed means that includes a diffusion pipe that is provided inside the circulation tank, and an undissolved ozone gas feed pipe that connects the ozonation means and the diffusion pipe, and introduces ozone gas that has not been dissolved in the dissolving water using the ozonation means into the diffusion pipe.

EXAMPLES

The invention is further described below by way of examples. Note that the invention is not limited to the following examples.

Example 1

Figure 2:
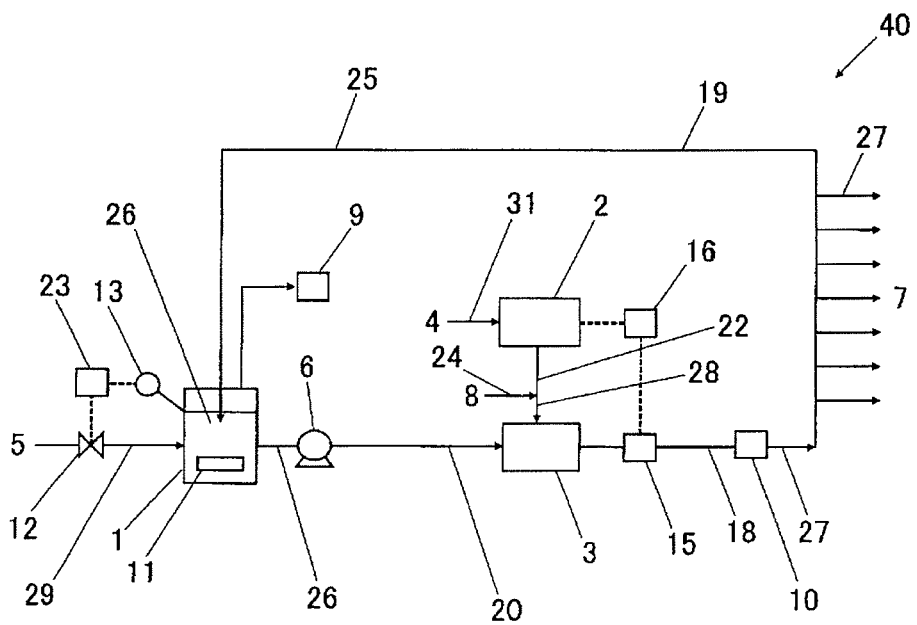
FIG. 2 is a flow diagram illustrating an ozonated water supply device (see the examples).
Figure 3:
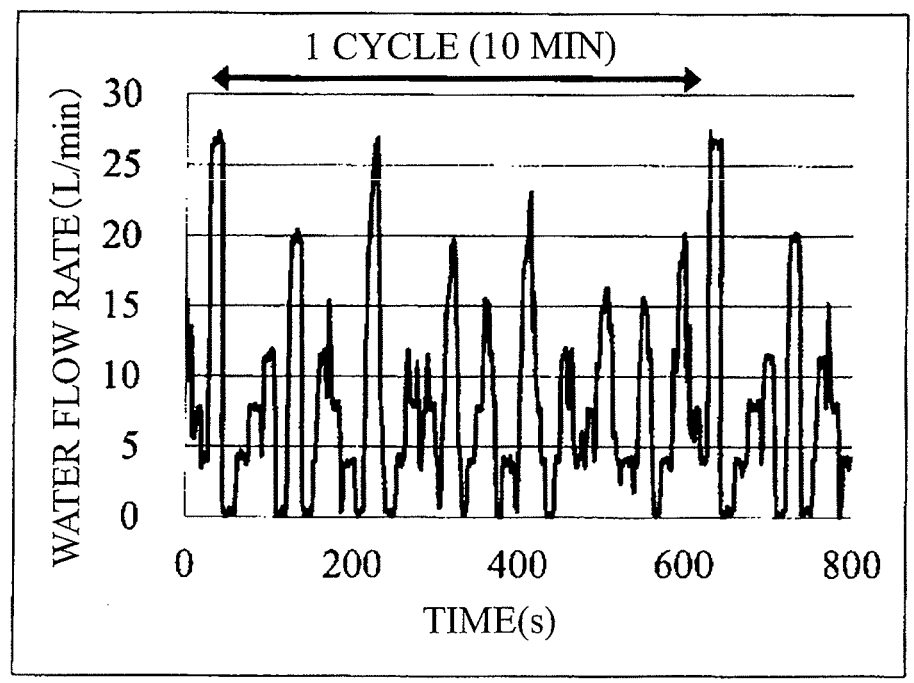
FIG. 3 is a graph illustrating a change in the amount of water used at a use point (see the examples).

Ozonated water was supplied in accordance with the flow diagram illustrated in FIG. 2.

Ultrapure water (feed water) having a specific resistivity of 18 MΩ·cm or more and a TOC content of 1.0 ppb or less was fed to a circulation tank 1 made of PFA. High-purity oxygen gas (feed gas) having a nitrogen gas content of 0.01 vol % was fed to a nitrogen-free-compliant discharge-type ozone gas production device 2 ("GRF-RG" manufactured by Sumitomo Precision Products Co., Ltd.) at 8 SLM (L/min at 0° C., 1 atm) through an oxygen gas feed pipe. Carbon dioxide was added to ozone gas produced by the ozone gas production device 2 at 100 SCCM (mL/min at 0° C., 1 atm), and the mixture was dissolved in the dissolving water using an ozonation membrane 3 made of PTFE. The ozone gas that had not been dissolved using the ozonation membrane was fed to an ozone gas decomposition means.

The capacity of the circulation tank 1 was controlled to be 40 L using a water feed rate control means (water feed rate control section 23, level gauge 13, and water feed valve 12).

The dissolving water contained in the circulation tank 1 was fed to the use point through the ozonation membrane 3 using a magnetically suspended feed pump 6 ("BPS-4" manufactured by Levitronix Japan K.K.) (flow rate: 30 L/min, hydraulic pressure: 300 kPa). The concentration of the ozonated water was adjusted to 30 ppm using a concentration meter 15 and an ozone gas production control section 16. A particle removal filter 10 was provided to an ozonated water feed pipe 18.

When a plurality of use points are provided, the amount of water used at the use points may continually change. In view of such a situation, the experiment was performed while changing the amount of water used at the use point so that the average amount of water used at the use point was 25% (i.e., about 7.5 L/min) of the water feed rate.

The feed rate of the ozonated water was 27.3 to 33.0 L/min, and the dissolved ozone concentration was 27.2 to 32.5 ppm. Specifically, the feed rate of the ozonated water and the dissolved ozone concentration were stable. The average discharge power of the discharge-type ozone gas production device was 30.2%, and the nitric acid concentration in the ozonated water measured after 2 hours of continuous operation was 5 ppb (minimum limit of determination) or less. The rotational speed of the feed pump was set to 8,500 rpm, and the number of particles (particle size: 0.05 μm or more) included in the ozonated water (at the use point) was 10 or less per mL.

Example 2

An experiment was performed in the same manner as in Example 1, except that the ozonated water was not used at the use point (i.e., the ozonated water was returned to the circulation tank in a ratio of 100% (i.e., the average use ratio at the use point was 0%)).

The feed rate of the ozonated water was approximately 30.0 L/min, and the dissolved ozone concentration was approximately 30.0 ppm. The average discharge power of the discharge-type ozone gas production device was 17.4%, and the nitric acid concentration in the ozonated water measured after 2 hours of continuous operation was 5 ppb (minimum limit of determination) or less. The rotational speed of the feed pump was set to 8,500 rpm, and the number of particles (particle size: 0.05 μm or more) included in the ozonated water (at the use point) was 10 or less per mL.

Example 3

Ozonated water was supplied in accordance with the flow diagram illustrated in FIG. 1.

Ultrapure water (feed water) having a specific resistivity of 18 MΩ·cm or more and a TOC content of 1.0 ppb or less was fed to a circulation tank 1 made of PFA. High-purity oxygen gas (feed gas) having a nitrogen gas content of 0.01 vol % was fed to a nitrogen-free-compliant discharge-type ozone gas production device 2 ("GRF-RG" manufactured by Sumitomo Precision Products Co., Ltd.) at 8 SLM (L/min at 0° C., 1 atm) through an oxygen gas feed pipe. Carbon dioxide was added to ozone gas produced by the ozone gas production device 2 at 100 SCCM (mL/min at 0° C., 1 atm), and the mixture was dissolved in the dissolving water using an ozonation membrane 3 made of PTFP. The ozone gas that had not been dissolved using the ozonation membrane was fed to a diffusion section 11 provided inside the circulation tank 1.

The capacity of the circulation tank 1 was controlled to be 40 L using a water feed rate control means (water feed rate control section 23, level gauge 13, and water feed valve 12). The dissolving water contained in the circulation tank 1 was fed to the use point through the ozonation membrane 3 using a magnetically suspended feed pump 6 ("BPS-4" manufactured by Levitronix Japan K.K.) (flow rate: 30 L/min, hydraulic pressure: 300 kPa). The concentration of the ozonated water was adjusted to 30 ppm using a first concentration meter 14, a second concentration meter 15, and an ozone gas production control section 16. A particle removal filter 10 was provided to a return pipe 19. When a plurality of use points are provided, the amount of water used at the use points may continually change. In view of such a situation, the experiment was performed while changing the amount of water used at the use point so that the average amount of water used at the use point was 25% (i.e., about 7.5 L/min) of the water feed rate.

The feed rate of the ozonated water was 27.3 to 33.0 L/min, and the dissolved ozone concentration was 29.0 to 31.0 ppm. Specifically, the feed rate of the ozonated water and the dissolved ozone concentration were stable. The average discharge power of the discharge-type ozone gas production device was 26.4%, and the nitric acid concentration in the ozonated water measured after 2 hours of continuous operation was 5 ppb (minimum limit of determination) or less. The rotational speed of the feed pump was set to 7,500 rpm, and the number of particles (particle size: 0.05 μm or more) included in the ozonated water (at the use point) was 10 or less per mL.

Example 4

An experiment was performed in the same manner as in Example 3, except that the ozonated water was not used at the use point (i.e., the ozonated water was returned to the circulation tank in a ratio of 100% (i.e., the average use ratio at the use point was 0%)).

The feed rate of the ozonated water was approximately 30.0 L/min, and the dissolved ozone concentration was approximately 30.0 ppm. The average discharge power of the discharge-type ozone gas production device was 13.2%, and the nitric acid concentration in the ozonated water measured after 2 hours of continuous operation was 5 ppb (minimum limit of determination) or less. The rotational speed of the feed pump was set to 7,500 rpm, and the number of particles (particle size: 0.05 μm or more) included in the ozonated water (at the use point) was 10 or less per mL.

Comparative Example 1

Ozonated water was supplied in accordance with the flow diagram illustrated in FIG. 2.

Ultrapure water (feed water) having a specific resistivity of 18 MΩ·cm or more and a TOC content of 1.0 ppb or less was fed to a circulation tank 1 made of PFA. High-purity oxygen gas (feed gas) having a nitrogen gas content of 1 vol % was fed to a nitrogen-free-non-compliant discharge-type ozone gas production device 2 ("GRC-RG" manufactured by Sumitomo Precision Products Co., Ltd.) at 8 SLM (L/min at 0° C., 1 atm) through an oxygen gas feed pipe. Carbon dioxide was added to ozone gas produced by the ozone gas production device 2 at 100 SCCM (mL/min at 0° C., 1 atm), and the mixture was dissolved in the dissolving water using an ozonation membrane 3 made of PTFE. The ozone gas that had not been dissolved using the ozonation membrane was fed to an ozone gas decomposition means.

The capacity of the circulation tank 1 was controlled to be 40 L using a water feed rate control means (water feed rate control section 23, level gauge 13, and water feed valve 12). The dissolving water contained in the circulation tank 1 was fed to the use point through the ozonation membrane 3 using a magnetically suspended feed pump 6 ("BPS-4" manufactured by Levitronix Japan K.K.) (flow rate: 30 L/min, hydraulic pressure: 300 kPa). The concentration of the ozonated water was adjusted to 30 ppm using a concentration meter 15 and an ozone gas production control section 16. A particle removal filter 10 was provided to an ozonated water feed pipe 18. The ozonated water was not used at the use point (i.e., the ozonated water was returned to the circulation tank in a ratio of 100% (i.e., the average use ratio at the use point was 0%)).

The feed rate of the ozonated water was approximately 30.0 L/min, and the dissolved ozone concentration was approximately 30.0 ppm. The average discharge power of the discharge-type ozone gas production device was 17.1%, and the nitric acid concentration in the ozonated water measured after 2 hours of continuous operation was 573 ppb. The rotational speed of the feed pump was set to 8,500 rpm, and the number of particles (particle size: 5 μm or more) included in the ozonated water (at the use point) was 10 or less per mL.

REFERENCE SIGNS LIST

1 Circulation tank
2 Ozone gas-producing means
3 Ozonation means
4 Oxygen gas
5 Ultrapure water
6 Feed means
7 Use point
8 Carbon dioxide
9 Ozone gas decomposition means
10 Filter
11 Diffusion section
12 Water feed valve
13 Level gauge
14 First concentration meter
15 Second concentration meter
16 Ozone gas production control section
18 Ozonated water feed pipe
19 Return pipe
20 Dissolving water feed pipe
21 Undissolved ozone gas feed pipe
22 Ozone-containing gas feed pipe
23 Water feed rate control section
24 Carbon dioxide feed pipe
25 Ozonated water returned from use point
26 Dissolving water
27 Ozonated water
28 Ozone-containing gas
29 Supply water feed pipe
30 Ozonated water supply device
31 Gas feed pipe

The invention claimed is:
1. An ozonated water supply method comprising:
feeding dissolving water contained in a circulation tank to an ozone gas dissolver at a given feed rate while feeding ultrapure water to the circulation tank, and returning ozonated water that has not been used at a use point to a position under the liquid surface in the circulation tank, dissolving ozone in the dissolving water using the ozone gas dissolver to obtain ozonated water, and feeding the ozonated water to the use point;

feeding oxygen gas having a nitrogen gas content of 0.01 vol % or less to a discharge-type ozone gas producer, producing ozone gas using the discharge-type ozone gas producer to obtain an ozone-containing gas, and feeding the ozone-containing gas to the ozone gas dissolver;

utilizing a first controller to adjust a height of a liquid level of the dissolving water in the circulation tank to adjust a feed rate of the ultrapure water to be fed to the circulation tank, said height of the liquid level being measured by a level gauge coupled to the first controller; and utilizing a second controller to adjust an amount of ozone to be dissolved in the dissolving water to adjust a dissolved ozone concentration in the ozonated water, by measuring a dissolved ozone concentration in the dissolving water, before being fed to the ozone gas dissolver, calculating a feed rate of ozone gas required to increase dissolved ozone concentration to a dissolved ozone concentration required at a use point from a difference between the dissolved ozone concentration in the dissolving water before being fed to the ozone gas dissolver and the dissolved ozone concentration required at the use point to calculate the feed rate of ozone gas to be fed to the ozone gas dissolver, and adjusting a feed rate of an ozone-containing gas to the ozone gas dissolver, wherein an amount of the ultrapure water fed to the circulation tank is changed in a manner that corresponds to a change in an amount of the ozonated water used at the use point.

2. The ozonated water supply method according to claim 1, further comprising removing particles from the ozonated water that is returned from the use point using a particle removal filter.

3. The ozonated water supply method according to claim 1, further comprising feeding ozone gas that has not been dissolved in the dissolving water using the ozone gas dissolver to the circulation tank.

4. The ozonated water supply method according to claim 1, wherein the dissolved ozone concentration in the ozonated water is adjusted by measuring a dissolved ozone concentration in the dissolving water, calculating a feed rate of ozone to be fed to the ozone gas dissolver based on the measured dissolved ozone concentration, and adjusting a feed rate of the ozone-containing gas to the ozone gas dissolver.

5. An ozonated water supply device comprising a circulation tank to which ultrapure water is fed, and to which ozonated water is returned from a use point, discharge-type ozone gas producer that produces ozone gas to obtain an ozone-containing gas, an oxygen gas feed pipe that feeds oxygen gas having a nitrogen gas content of 0.01 vol % or less to the ozone gas producer, an ozone gas dissolver that dissolves the ozone gas produced by the discharge-type ozone gas producer in dissolving water to obtain ozonated water, a dissolving water feed pipe that connects the circulation tank and the ozone gas dissolver, an ozone-containing gas feed pipe that connects the ozone gas producer and the ozone gas dissolver, an ozonated water feed pipe that connects the ozone gas dissolver and the use point, a return pipe that connects the use point and the circulation tank, a first controller that controls a height of a liquid level in the circulation tank, a level gauge that is coupled to the first controller and measures the height of the liquid level, a second controller that adjusts a dissolved ozone concentration in the ozonated water, and a dissolved ozone concentration adjuster that adjusts a dissolved ozone concentration in the ozonated water, wherein an end of the return pipe is situated in the circulation tank at a position under the liquid surface and the first controller and the second controller change an amount of the ultrapure water to be fed to the circulation tank corresponding to the change in an amount of the ozonated water used at the use point.

6. The ozonated water supply device according to claim 5, further comprising a particle removal filter that is provided to the return pipe.

7. The ozonated water supply device according to claim 5, further comprising undissolved ozone gas feed pipe that feeds ozone gas that has not been dissolved in the dissolving water using the ozone gas dissolver to the circulation tank.

8. The ozonated water supply device according to claim 5, wherein the dissolved ozone concentration adjuster comprises a first concentration meter that measures a dissolved ozone concentration in the dissolving water, and a calculation section that calculates a feed rate of the ozone gas to be fed to the ozone gas dissolver based on the dissolved ozone concentration measured by the first concentration meter, and transmits an instruction that instructs to adjust an amount of ozone gas produced to the discharge-type ozone gas producer.

9. An ozonated water supply method comprising:

feeding dissolving water contained in a circulation tank to an ozone gas dissolver at a given feed rate while feeding ultrapure water to the circulation tank, and returning ozonated water that has not been used at a use point to a position under the liquid surface in the circulation tank, dissolving ozone in the dissolving water using the ozone gas dissolver to obtain ozonated water, and feeding the ozonated water to the use point;

feeding oxygen gas having a nitrogen gas content of 0.01 vol % or less to a discharge-type ozone gas producer, producing ozone gas using the discharge-type ozone gas producer to obtain an ozone-containing gas, and feeding the ozone-containing gas to the ozone gas dissolver;

utilizing a first controller to adjust a height of a liquid level of the dissolving water in the circulation tank to adjust a feed rate of the ultrapure water to be fed to the circulation tank, said height of the liquid level being measured by a level gauge coupled to the first controller; and utilizing a second controller to adjust an amount of ozone to be dissolved in the dissolving water to adjust a dissolved ozone concentration in the ozonated water, by measuring a dissolved ozone concentration in the dissolving water, before being fed to the ozone gas dissolver, calculating a feed rate of ozone gas required to increase dissolved ozone concentration to a dissolved ozone concentration required at a use point from a difference between the dissolved ozone concentration in the dissolving water before being fed to the ozone gas dissolver and the dissolved ozone concentration required at the use point to calculate the feed rate of ozone gas to be fed to the ozone gas dissolver, and adjusting a feed rate of an ozone-containing gas to the ozone gas dissolver, wherein the first and second controllers adjust the feed rate of the ultrapure water fed to the circulation tank by adjusting the height of the liquid level of the dissolving water in the circulation tank, whereby an amount of the ultrapure water fed to the circulation tank is changed.

\* \* \* \* \*